United States Patent Office 2,989,439
Patented June 20, 1961

2,989,439
PROCESS FOR PROMOTING MICROBIAL TRANSFORMATION REACTIONS
Elmer A. Weaver, Spring Mount, and Harold E. Kenney, Hatboro, Pa., assignors to the United States of America as represented by the Secretary of Agriculture
No Drawing. Filed Oct. 10, 1958, Ser. No. 766,625
9 Claims. (Cl. 195—51)
(Granted under Title 35, U.S. Code (1952), sec. 266)

A non-exclusive, irrevocable, royalty-free license in the invention herein described, throughout the world for all purposes of the United States Government, with power to grant sublicenses for such purposes, is hereby granted to the Government of the United States of America.

This invention relates to a procedure for using microbial cells to perform desired chemical or biological transformations. More particularly, the present invention relates to procedures whereby an abundance of cell growth is first obtained in the usual manner and then limited growth conditions are imposed by dilution of the culture (ferment) with large volumes of purified water at or about the time the substrate is added, and continuing the fermentation in the usual manner.

By purified water we mean water which, through distillation, ion-exchange treatment, or other treatment including that of natural causes, is relatively free of solute and solid impurities.

The process of this invention is particularly applicable to transformations involving the use of costly reactants where the end-products must be in a high state of purity before further use. Some examples are the microbial oxygenation of steroids in the manufacture of cortisone and other related physiologically active compounds, and the preparation of antibiotics, especially antibiotics like penicillin, where certain substances are added as precursors to the fermentation for increased penicillin production. The present process may also be used to advantage in oxidative reactions such as changes of sugars to acids (acetic, citric and other mono- and poly-basic acids), sugars to alcohols (ethanol, glycerol, and other mono- and polyhydroxy alcohols), sulfur to sulfates, and other processes wherever microbial cells are used to perform desirable transformation reactions.

The process of the present invention is illustrated by its application to microbial oxygenation of steroids, more particularly by the introduction of 11-hydroxyl groups into pregnane derivatives. The results are purer products, increased yields, and less di- and poly-hydroxylated by-products. One of the disadvantages of the microbiological method for introducing a hydroxyl group in a preferred position on a cortisone precursor is the simultaneous introduction of additional hydroxyl groups in undesirable positions. Another disadvantage is that the extracts containing the products are heavily contaminated with oil, fats, waxes, and the like, which were present in the fermentation liquor and microbial cells.

According to the present invention, a medium suitable for the growth of the organism to be used is inoculated with a selected species of microorganism and the propagation of the microorganism is encouraged by incubation under favorable environmental conditions such as proper temperature agitation and regulation of air uptake. When an abundant cell growth is obtained the entire actively growing ferment, or a representative portion of it sufficient to perform the transformation of the substrate, is diluted with a volume of purified water many fold the selected volume of the propagation medium. The substrate to be transformed is added and the diluted culture is incubated under conditions favorable to growth of the microorganism and to the transformation of the substrate. The reaction product and unreacted substrate are recovered and isolated by conventional procedure.

In a preferred embodiment of the present invention an hydroxy group is introduced at the key 11-position of pregnane derivatives such as progesterone and $16\alpha,17\alpha$-epoxy-pregnan-3,20-dione by the process comprising culturing a selected microorganism, for example, *Rhizopus nigricans* ATCC–6227b, *Aspergillus ochraceus* NRRL–405, and *Cunninghamella blakesleana* QM–631, in a standard medium for a period of time sufficient to develop an abundant cell growth, diluting the culture with purified water, preferably with enough purified water to give a final volume of about 10 to 100 times that of the volume of the culture diluted, adding the substrate to be microbially oxidized, incubating the diluted culture containing the steroid substrate under conditions favorable to the growth of the organism and to introduction of the 11-hydroxy group, extracting and isolating the 11-hydroxy steroid product and the unreacted substrate.

As illustrated in the accompanying examples, under the dilution conditions the microbial cells continue to grow and to carry on life activities, but the stored reserve materials in the microbial cells plus the limited amounts of nutrients in the liquid portion of the culture serve as a limited supply of growth nutrients for the microorganisms.

By this continued cell growth, energy consumption, breakdown and re-synthesis of cell components in the dilution fermenter, substantially all residual nutrients carried over from the original culture plus reserve growth materials stored within the cells are metabolized. Apparently the objectionable oils, fats, waxes, and resins are also caused to be metabolized. In all instances where the dilution process was employed the quantity of these materials was markedly reduced, and under optimum dilution conditions they are practically eliminated and are hence not recoverable in the organic solvent used to recover the steroid at the end of the fermentation. This condition is illustrated by the presence of a large amount of chloroform-soluble, brownish-black, oily to waxy solids extractable when *Rhizopus nigricans* is grown in undiluted media, whereas the extract from *R. nigricans* after growth in the dilution fermenter yields little chloroform extractable solids and little to no color is present. The same situation is true when the species of microorganism being used is *Aspergillus ochraceous*, *A. nidulans*, *A. niger*, and other oxygenating organisms. These main sources of contaminating impurities in the oxygenated product are thus eliminated in the recovered product.

The substrate transformation in many fermentations is not complete and may range up to 85% unreacted substrate. This unreacted substrate has been recovered in our dilution fermentations and re-used with no need for purification steps since the substrate is recovered in a high state of purity. This re-use of the substrate with no need for purification can be repeated many times with significant savings in time, effort and cost of materials.

In addition to a purer product, the process of the present invention has, most unexpectedly, often provided a higher percentage yield of the desired oxygenated product. For example, employing *Aspergillus ochraceous* as the microorganism, $16\alpha,17\alpha$-epoxy-pregnan-3,20-dione was oxygenated under usual fermentation conditions to give a 29% yield of the $11\alpha$-hydroxy product. When the same fermentation was duplicated with the only variable that of diluting the original volume with distilled water to 25 volumes, the result was a 40% yield of the desired product. This aspect of the invention is illustrated in greater detail in Examples 5, 6 and 7. In Example 4, a strain of *Cunninghamella blakesleana* QM–631 was able to oxygenate progesterone in the 15-times dilution fermentation, whereas no such oxygenation occurred in the undiluted fermentation.

It was furthermore discovered that the process of this invention favors the introduction of only one hydroxyl group, thus increasing the overall yield of desired oxygenated product from a given amount of substrate. When the oxygenation process results in compounds containing more than one added hydroxyl group, these products are usually not suitable precursors for subsequent chemical reactions and removal of this steroid material means less substrate for recycling. In our process, the yields of monohydroxylated products are comparable to or better than those extracted from undiluted media, and, in addition, the unreacted substrate is recoverable in a high state of purity for recycling.

A further advantage of this inventive process is the complete elimination of foaming problems during the entire course of the fermentation. Current methods of conducting the fermentation frequently result in the production of large amounts of foam. Anti-foam agents are then required to be added to the fermenter. These anti-foam agents constitute impurities and serve to reduce the purity of desirable recovered products. Furthermore, the foam serves to carry quantities of the substrate up out of the medium and deposit it in regions of the fermenter out of reach of the oxygenating organism. Other disadvantages associated with the foam problem are that foam decreases aeration efficiency by limiting high aeration rates, adds to the problem of recovery by scattering the product over areas normally not reached by the extracting solvent, and also causes loss of substrate when foaming is uncontrolled and over-flow out of the fermenter occurs.

Two methods were used for evaluating the results of this invention. A procedure employing ascending paper chromatography was developed to give fast, accurate results as to the presence of 11-hydroxy constituents in the steroid substrate. This procedure (method A), used to evaluate oxygenation of the substrate while the fermentation was still running, will now be described.

A strip of chromatography paper, one-half inch wide and thirteen inches long was impregnated with a mixture of 20% propylene glycol and 80% acetone, and then spotted with a representative aliquot of the fermentation liquor. The developing solution was placed in the bottom of a 23 mm. by 300 mm. test tube and the paper suspended from a cork in the top of the tube. The developing solution for 16α,17α-epoxy-11α-hydroxy-pregnan-3,20-dione was a mixture of 25% benzene and 75% cyclohexane. The developing solution for 11α-hydroxy progesterone was a mixture of 50% benzene and 50% cyclohexane. The paper was developed for approximately thirty minutes to obtain satisfactory separation of the steroid components. The paper was then air-dried and sprayed with 5% phosphomolybdic acid in ethanol. With the type of paper and the solvents employed the solvent front moves about 150 mm. The unreacted substrate steroid moves in this front. The 11-hydroxy compounds move about 14 mm. from the origin. Compounds with more than one hydroxyl group, mainly fermentation by-products and medium components, stayed very near the origin.

Yields were determined by comparison with appropriate steroid controls using varying concentrations of the known compounds under the same conditions as the fermentation samples.

In the other method (method B) a procedure for quantitative yield determination of 16α,17α-epoxy-11α-hydroxy-pregnan-3,20-dione was developed. Fermentation samples were spotted on a papergram in such concentration that there would be approximately 300 micro-grams of the 11α-hydroxy compound present. In order to properly handle this concentration of steroid, a special papergram system was worked out. Double weight chromatography paper was marked for spotting and the paper, 18 inches long, was cut so that below each spot the paper had a width of ¾ inch. The paper was impregnated with a mixture of 40% propylene glycol and 60% acetone. After spotting in duplicate or triplicate, the paper was developed with a mixture of 30% benzene and 70% cyclohexane. After development of the paper for an appropriate period of time, one tail of the paper was sprayed with 5% phosphomolybdic acid in ethanol to locate the position of the 11-hydroxy compound. The corresponding area of a duplicate tail was cut out, the 11-hydroxy compound eluted with acetone, the eluate taken to dryness, and the solids dissolved in 10 ml. of concentrated sulfuric acid. The sulfuric acid solution was held at 22° C. for two hours, then used to obtain an absorption spectra in the 600 to 220γ range. The peak at 403γ was used for yield determination.

Implementation of the invention will depend on the selection of operating conditions optimum for the reaction desired, e.g.: adjustment of pH and medium composition; type of fermentation equipment such as reciprocal shakers or rotary shakers, size and shape of tanks with stirrer and baffles; the degree of dilution; the time of dilution; the age and quantity of inoculum; the nature of the solvent used for recovery of the products, etc.

Microorganisms for use in this invention were typically obtained by the procedure now described. A culture received from an authentic source, for example a culture of *Rhizopus nigricans* ATCC-6227b, obtained from the American Type Culture Collection, was maintained on a medium consisting of 50 grams of malt extract plus 2 ml. of corn steep liquor per liter of tap water. Incubation temperature was about 28° C. Sixteen ounce French square bottles containing 50 ml. of 6 mm. diameter glass beads and 75 ml. of the above described medium were used to grow the culture at this stage. The organism produced a great abundance of both mycelial growth and spore formation on this medium. Prior to using the culture, the air permeable cap on the bottle was replaced with a sterile solid cap and the bottle was shaken for about 5 minutes to dislodge the spores and to disperse the mycelial mat. This growth was used as the inoculum, 2% volume to volume basis, into the particular media used to propagate the organism prior to transfer into the dilution fermenter. Variables in the above procedure are the source of the original culture and the medium upon which the cultures are maintained in the French bottles.

The following detailed examples are illustrative of some of the applications of the process of the present invention.

EXAMPLE 1

The medium for propagating the organism contained 20 grams Edamin (lactalbumin digest), 50 grams dextrose, and 5 ml. corn steep liquor per liter of tap water. The medium was adjusted to pH 4.5 by addition of concentrated HCl. This medium was added to Fernbach flasks, 300 ml. to a flask, and autoclaved for 15 minutes at 15 lbs. p.s.i.g. When cooled to room temperature the medium was inoculated with *Rhizopus nigricans* ATCC-6227b and incubated at 28° C. for 22 hours with agitation by a reciprocal shaker. The mycelial development was abundant.

Two flasks were retained for duplicate controls. From another Fernbach flask 30 ml. of the abundant cell growth was aseptically transferred to each of two flasks containing 270 ml. of sterile, distilled water. The latter flasks were designated as a 10× dilution. To each of the four flasks was added 75 mg. (25 mg. per 100 ml. liquid) of 16α,17α-epoxy-pregnan-3,20-dione dissolved in 3 ml. of 1:1 acetone-ethanol solvent. The Fernbach flasks were then returned to the shaker and incubation continued at 28° C. for 48 hours. The substrate and reaction products were recovered from each of the flasks by three successive extractions with one-half volumes of chloroform. The chloroform extract was washed several times with distilled water, then evaporated to near dryness in a stream of air on a steam bath. The extracts were transferred to sample bottles, filtering out solids if necessary, and results of the fermentation evaluated by the methods previously described.

Table I
YIELD OF 11α-HYDROXY PRODUCT FOLLOWING 48 HOUR FERMENTATION

|  | Method A analysis, percent | Method B analysis, percent |
| --- | --- | --- |
| Undiluted control | 40 | 40 |
| 10× dilution | 40 | 37 |

After removal of paper chromatography aliquots, the remaining 60 mg. of steroids in the sample of the 10× dilution extract dissolved in 50% Skelly B (essentially hexane)-in-benzene was resolved on a chromatography column of 250 mg. Florosil (dried 3 hours at 250° C.) to confirm the microbiological oxidation. From 50% Skelly B-in-benzene eluants were recovered 36 mg. of unreacted steroid, M.P. 165–172° C. Benzene eluants contained no steroids. The 5% chloroform-in-benzene eluants contained 19 mg. of product, M.P. 164–168° C., which was identified by papergram and infrared analysis to be 16α,17α-epoxy-11α-hydroxy-pregnan-3,20-dione.

EXAMPLE 2

The fermentations of this example were performed with the same culture, media, and growth conditions as Example 1. Progesterone as well as 16α,17α-epoxy-pregnan-3,20-dione was used as the steroid substrates in 10× and 50× dilutions.

The following results were obtained by Method A analysis.

Table II
YIELD OF 11α-HYDROXY PRODUCT FOLLOWING 96 HOUR FERMENTATION

| Substrate (Steroid) | Dilution Factor | Hydroxylated Product, Percent | Unreacted Substrate, Percent |
| --- | --- | --- | --- |
| 16α,17α-epoxy-pregnan-3,20-dione | 10× | 40 | 60 |
| Do | 50× | 40 | 60 |
| Progesterone | 10× | 40 | 60 |
| Do | 50× | 40 | 60 |

This table shows that the dilution growth technique applies equally well to the two different steroid substrates.

The steroids of the progesterone 10× dilution, 96 hour fermentation were extracted and resolved as in Example 1. After removal of paper chromatography aliquots, the remaining 73 mg. of steroids were added to a Florosil column. From the 50% Skelly B-in-benzene eluants were recovered 39 mg. of unreacted progesterone. The solids from the benzene eluant were recrystallized from light petroleum (B.P. 88–98° C.) to give 32 mg. of 11α-hydroxylated progesterone, M.P. 160–163° C. A 5% ethanol-in-benzene eluant contained a slight amount of resin with traces of diol.

EXAMPLE 3

All operations were carried out under aseptic conditions. Five milliliters of an eight day growth of *Rhizopus nigricans* ATCC–6227b, cultured in the 16 ounce French square bottle as previously described, was used to inoculate 350 ml. of a medium at pH 4.5 prepared according to the following recipe: 40 grams whole potato solids, 10 grams dextrose, and 5 ml. corn steep liquor per liter of tap water. The Fernbach flask was incubated 23 hours at 28° C. on a reciprocal shaked. Excellent mycelial development occurred. Representative 100 ml. aliquots of this mycelial growth were used to inoculate one liter portions of the medium described in Examples 1 and 2, contained in four-liter aspirator bottles. The aspirator bottles were equipped with an air inlet tube, an air outlet tube, and a transfer line assembly. The air entering and leaving the bottle was sterile filtered. The bottles were incubated at 28° C. on a rotary shaker set at 240 r.p.m. with a 1½ inch diameter stroke. At the end of 25 hours' incubation there was excellent mycelial development.

The entire contents of one of the aspirator bottles was transferred to a five gallon glass jug containing 10,900 ml. of distilled water. The jug was equipped with air inlets and outlets, a sampling tube, and an agitator. The agitator propeller turned at 500 r.p.m. This speed was sufficient to cause a vortex formation extending nearly to the bottom of the jug. The end of the air inlet line was kept an inch above the vortex created by the propeller. Air was introduced into the jug at the rate of one-third volume per minute. Three grams of 16α,17α-epoxy-pregnan-3,20-dione dissolved in 120 ml. of 1:1 acetone-ethanol was added to the jug and incubation started at 28° C. The fermentation ran smoothly with no foaming troubles and with good dispersion of the mycelium.

After 66 hours' fermentation, a 300 ml. sample was withdrawn for examination. By method A analysis it was found that about 40% of the steroid was monohydroxylated. The pH of the medium was 3.80 and the mycelium had a white color indicative of complete metabolism of any stored oils, fats, waxes or resins in the mycelium. The mycelial volume increased from an initial of 1.14% to 6.8%.

The fermentation was stopped after a total of 114 hours' incubation. Steroid analysis by method A showed little change from the 66 hour determination. The pH was now 3.82, essentially the same as before, and mycelial color was the same. The mycelial volume increased slightly to 7.20%.

The mycelium was removed from the liquid medium and extracted three times with an equal volume of acetone, followed by three extractions with an equal volume of chloroform. The liquid medium was extracted seven times with one-quarter volume of chloroform. All extracts were combined and evaporated to dryness on a steam bath under a stream of air. The residue was dissolved in 50% Skelly B-in-benzene and resolved by column chromatography. Unreacted steroid recovered was 1.71 grams. Mono-hydroxylated product, recrystallized from light petroleum (B.P. range 88–98° C.) weighed 1.12 grams, M.P. 168–170° C. Hence, the yield of 16α,17α-epoxy-11α-hydroxy-pregnan-3,20-dione approximated that indicated by method A analysis.

In a control fermentation the contents of one of the aspirator bottles was transferred to a five gallon glass jug containing 10,900 ml. of the propagation medium described in Example 1. Steroid substrate and operational procedures were the same as that of the dilution fermentation just described. Foaming presented a serious problem during the fermentation. The final mycelium volume was 40% (more than five times that of the dilution fermentation) yet the yield of mono-hydroxylated product was not improved. The mycelium was a light brown color and the extract with the steroid contained large amounts of waxes and resins.

EXAMPLE 4

A culture of *Cunninghamella blakesleana* QM–631, obtained from the culture collection of the Pioneering Research Laboratories of the Quartermaster Research and Development Center, Natick, Massachusetts, was grown by typical procedures. The propagation medium, pH 4.5, contained 25 grams whole potato solids, 20 grams dextrose, and 5 ml. of corn steep liquor per liter of tap water. To 300 ml. of this medium in Fernbach flasks was added 6 ml. of the mixture of mycelial growth and spores. After 23 hours' incubation at 28° C. on a reciprocal shaker at 90 strokes per minute with a 3 inch stroke the mycelium had developed a full growth. At this time 20 ml. of the mycelial growth was transferred to a Fernbach flask containing 280 ml. of distilled water (a 15× dilution). Progesterone, 75 mg. dissolved in 3 ml. 1:1 acetone-ethanol, was added to the flask. The flask was returned to the shaker and incubated for 44 hours. A control flask containing 280 ml. of the propagation medium received the same inoculum, steroid substrate, and incubation. Results of analyses are presented in Table III.

*Table III*

MONO-HYDROXYLATION OF PROGESTERONE BY *CUNNINGHAMELLA BLAKESLEANA* QM-631

| Medium | Mono-Hydroxylation, Percent |
|---|---|
| Undiluted | 0 |
| 15× dilution | .30 |

The chloroform extract from the undiluted fermentation was yellow and resinous. The extract from the 15× dilution was white and crystalline.

With this particular fermentation the dilution technique was the critical factor in achieving microbiological oxidation of the steroid substrate. In addition, the steroids from the dilution medium were recovered in an exceptionally pure state.

EXAMPLE 5

A culture of *Aspergillus ochraceus* NRRL–405 was obtained from the culture collection of the Northern Utilization Research and Development Division, Agricultural Research Service, Peoria, Illinois. The maintainance medium was the same as that employed for subsequent propagation: 50 grams dextrose, 20 grams lactalbumin digest, and 6.3 ml. corn steep liquor per liter of tap water. This medium was adjusted to pH 6.3 with potassium hydroxide. Temperature employed was in all instances 28° C.

Fernbach flasks containing 300 ml. of medium were inoculated with 5 ml. of mycelium-spore mixture and incubated on a reciprocal shaker at 90 strokes per minute with a three inch excursion distance. After 19 hours of incubation there was an abundance of microbial cells. In this example a comparison was made between fermentation in this medium and in a 25× dilution with distilled water. Steroid substrate of 16α,17α-epoxy-pregnan-3,20-dione was added at the level of 10 mg. in one ml. 1,2-propanediol per 100 ml. of medium. Flasks containing the steroid substrate were placed on the shaker and incubated for 30 hours. Each flask was extracted six times with one-half volume of ethyl acetate, the six portions combined and evaporated to dryness on a steam bath.

The dried extracts were weighed and the yields of 11α-hydroxylated steroid determined by the method B quantitative analysis. Data are presented in Table IV.

*Table IV*

HYDROXYLATION OF 16α,17α-EPOXY-PREGNAN-3,20-DIONE BY *ASPERGILLUS OCHRACEUS*

| Medium | Mono-Hydroxylation, percent | Extractables per 100 ml. medium | |
|---|---|---|---|
| | | 11α-ol, mg. | Other solids, mg. |
| Undiluted | 29 | 2.9 | 49 |
| 25× dilution | 40 | 4.0 | 12 |

After subtracting the unreacted steroid from the weight of "other solids" it is apparent that in the example the extract of the regular fermentation contained about seven times as much impurities as that of the dilution fermentation. Resolution of the extracts indicated that though 25× dilution fermentation had produced less di- and poly-hydroxy steroids than the undiluted fermentation.

EXAMPLE 6

The procedures of Example 5 were repeated with the exception that the organism was grown for 48 hours before making the dilutions and adding the steroid substrate. Preliminary runs had indicated that this longer exposure of the organism to growth in undiluted medium permitted the organism to build up a high concentration of reserve materials, at least part of which were organic solvent extractables. Accordingly, a 100× dilution fermentation was included.

The 48 hour growth was used to prepare 25× and 100× dilutions with distilled water in Fernbach flasks. The steroid substrate was added, and the cultures were incubated on the reciprocal shaker for a total of 6 hours. Samples were taken at two hour intervals for analysis by method A. Results are presented in Table V.

*Table V*

EFFECT OF DILUTION UPON RATE AND YIELD OF HYDROXYLATED PRODUCT

| Incubation Hours | 25× Dilution, percent 11-ol | 100× Dilution, percent 11-ol |
|---|---|---|
| 2 | 10 | 5 |
| 4 | 15 | 25 |
| 6 | 25 | 35 |

The extract from the 25× dilution was somewhat resinous, whereas that of the 100× dilution was crystalline. This example shows that even in the 25× dilution medium a very high build-up of reserve materials is not disposed of by the organism in short time fermentations.

These results further illustrate that the activity of the organism, as measured by production of 11α-hydroxylated product, is considerably slowed up in the presence of a large amount of organic solvent extractables, referred to as reserve cell storage materials. These same interfering substances are present in the organism after shorter incubation periods, such as 18 to 25 hours, but to a lesser degree. Subsequent incubation of the organism in diluted medium according to the process of this invention, as illustrated in this example, directs the metabolism of the organism towards destruction of these organic solvent extractables.

EXAMPLE 7

*Aspergillus ochraceus* NRRL–405 was cultured as described in Example 5. For the control fermentations 50 ml. of the 19 hour culture was transferred to 250 ml. Erlenmeyer flasks and 10 mg. progesterone in one ml. propylene glycol added to each flask. Dilution fermentations were 10×, i.e., 5 ml. of the culture and 45 ml. distilled water, and they received the same amount of steroid substrate. The flasks were incubated on a rotary shaker at 220 r.p.m. with a 2¼ inch stroke. After 6 hours' incubation the flasks were extracted as in Example 5 and the yields determined by method B.

The yield of 11α-hydroxy progesterone from the undiluted fermentation was 51%, that of the 10× dilution, 63%.

The dry weight of the mycelium at the time the fermentation was stopped showed 320 mg. weight for the undiluted medium and only 47 mg. for the 10× diluted medium.

In addition to the higher yield of the desired product obtained in the dilution medium, the problem of handling and disposing of the microbial cells is greatly simplified by the use of the process of the present invention.

EXAMPLE 8

This example was performed with the same culture and media of Examples 1 and 2, using the volumes, substrate and culturing conditions of Example 7. With the more vigorous agitation of the flasks the yields after 6 hours incubation were 50% greater than in Example 2. Data are presented in Table VI.

*Table VI*

HYDROXYLATION OF PROGESTERONE WITH *RHIZOPUS NIGRICANS* ATCC-6227b

| Medium | Mycelium Weight | Extractables | | |
|---|---|---|---|---|
| | | 11α-ol, mg. | Unreacted Steroid, mg. | Other Solids, mg. |
| Undiluted | 362 | 6.0 | 4.0 | 15.6 |
| 10× dilution | 81 | 6.0 | 4.0 | 2.0 |

These results are a further illustration of the operation of the invention wherein the yield of the 11α-hydroxy product is equal or better than that of the control, yet the weight of microbial cells and the weight of contaminating solids in the extract of the 10× dilution are only a fraction of that of the undiluted medium.

Dilutions illustrated in the examples range from 9 to 99 times the volume of the medium diluted, but even greater dilutions are considered applicable.

Although the invention has been illustrated by examples in which the concentration of the steroid substrate was 20-25 mg. per 100 ml. of the medium in which the substrate was incubated these amounts are not considered limiting on the concentrations of steroids which can be employed. The choice of adding the culture medium to the water diluent or the water diluent to the culture medium is left to the convenience of the operator.

We claim:

1. A process for the microbial transformation of a chemical substrate comprising culturing a species of microorganism in an aqueous nutrient medium under conditions favorable to development of an abundant cell growth, diluting a volume of the medium containing the abundant cell growth with about 9 to 99 times said volume of purified water, adding to the diluted culture the chemical substrate to be transformed, and culturing the microorganism under limited nutrient conditions while contacting the substrate with the chemical activity of said species of microorganism until the desired microbial transformation is achieved.

2. A process for the 11-hydroxylation of a pregnane derivative selected from the group consisting of progesterone and 16α,17α-epoxy-pregnan-3,20-dione comprising culturing a microorganism selected from the group consisting of *Rhizopus nigricans* ATCC-6227, *Aspergillus ochraceus* NRRL-405, and *Cunninghamella blakesleana* QM-631, in an aqueous nutrient medium under conditions favorable to an abundant cell growth, diluting a volume of the medium containing the abundant cell growth with about 9 to 99 times said volume of purified water, adding to the diluted culture a substrate selected from the group consisting of progestrone and 16α,17α-epoxy-pregnan-3,20-dione, and culturing said microorganism under the imposed limited nutrient conditions while contacting the substrate with the oxygenating activity of said microorganism.

3. The process of claim 2 in which the substrate added is progesterone.

4. The process of claim 2 in which the substrate added is 16α,17α-epoxy-pregnan-3,20-dione.

5. The process of claim 3 in which the species of microorganism is *Rhizopus nigricans* ATCC-6227b.

6. The process of claim 3 in which the species of microorganism is *Aspergillus ochraceus* NRRL-405.

7. The process of claim 3 in which the species of microorganism is *Cunninghamella blakesleana* QM-631.

8. The process of claim 4 in which the species of microorganism is *Rhizopus nigricans* ATCC-6227b.

9. The process of claim 4 in which the species of microorganism is *Aspergillus ochraceus* NRRL-405.

References Cited in the file of this patent

UNITED STATES PATENTS

| 2,602,769 | Murray et al. | July 8, 1952 |
| 2,658,023 | Shull et al. | Nov. 3, 1953 |
| 2,830,936 | Kits et al. | Apr. 15, 1958 |
| 2,844,513 | Wettstein et al. | July 22, 1958 |
| 2,848,370 | Divisson et al. | Aug. 19, 1958 |

OTHER REFERENCES

Wettstein: Experientia, vol. IX, Dec. 15, 1955, page 474.